(12) United States Patent
Komarov (10) Patent No.: US 11,222,082 B2
(45) Date of Patent: Jan. 11, 2022

(54) IDENTIFICATION OF A COMPUTER PROCESSING UNIT

(71) Applicant: INTEL CORPORATION, Santa Clara, CA (US)

(72) Inventor: Alexander Komarov, Munich (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/942,104

(22) Filed: Mar. 30, 2018

(65) Prior Publication Data

US 2019/0042650 A1 Feb. 7, 2019

(51) Int. Cl.
*G06F 16/30* (2019.01)
*G06F 9/455* (2018.01)
*G06F 16/951* (2019.01)

(52) U.S. Cl.
CPC ........ *G06F 16/951* (2019.01); *G06F 9/45558* (2013.01); *G06F 2009/45591* (2013.01); *G06F 2009/45595* (2013.01)

(58) Field of Classification Search
CPC . G06F 2009/45595; G06F 2009/45591; G06F 16/951; G06F 9/45558
USPC ........................................................ 715/722
See application file for complete search history.

(56) References Cited

U.S. PATENT DOCUMENTS

| 7,774,391 | B1 * | 8/2010 | Le | G06F 16/188 707/822 |
| 2017/0212774 | A1 | 7/2017 | Cerney et al. | |

FOREIGN PATENT DOCUMENTS

WO WO-2016004263 A1 * 1/2016 ............. G06F 21/53

OTHER PUBLICATIONS

HypervisorTopLvlFuncSpecWinSrvr2012R2 (Year: 2012).*
Intel, Intel® Virtualization Technology FlexMigration Application Note, Reference No. 323850-004, Oct. 2012, pp. 1-13.
Microsoft, "Hypervisor Top-Level Functional Specification: Windows Server 2012 R2", Released Version 4.0b, Aug. 8, 2013, pp. 1-420.
J. Szefer et al., "Eliminating the Hypervisor Attack Surfacefor a More Secure Cloud", Princeton University, Princeton, New Jersey, Oct. 17-21, 2011, pp. 1-12.
AMD, "Live Migration with AMD-V™ Extended Migration Technology", Publication No. 43781, Revision 3.00, Apr. 2008, pp. 1-17.
Igor Korkin, "Two Challenges of Stealthy Hypervisors Detection: Time Cheating and Data Fluctuations", National Research Nuclear University Moscow Engineering & Physics Institute (NRNU MEPhI) Department of Cryptology and Discrete Mathematics, Russia, Jun. 14, 2015, pp. 1-25.

(Continued)

*Primary Examiner* — Kuen S Lu
(74) *Attorney, Agent, or Firm* — Nicholson De Vos Webster & Elliott LLP (57) ABSTRACT

Particular embodiments described herein provide for a system that can be configured to determine an identification (ID) of a computer processing unit (CPU) using one or more tests and/or measurements, intercept the result of a query from a process to determine the ID of the CPU, replace the result of the query if the result of the query does not match the determined ID of the CPU, and communicate the result of the query that includes the determined ID of the CPU to the process. In an example, the query is a CPUID opcode and the results of the query are intercepted after passing through a hypervisor.

23 Claims, 6 Drawing Sheets

(56) References Cited

OTHER PUBLICATIONS

Alexander Komarov, "Benchmarking and tuning NFV, using Yardstick/ NSB, OVS, prox, perf, Intel PCM", Nov. 3, 2017, pp. 1-21.
"How to tell a CPU model, when running under a hypervisor that hides a real CPUID," Komarov, Alexander, retrieved from the internet on Jun. 6, 2018, <<hllps://soflware.intel.com/en-us/articles/how-to-tell-cpu-model-when-running>>.

* cited by examiner

CPU TABLE — 114

| 130<br>CPU ID | 132<br>L1 BANDWIDTH | 136<br>INSTRUCTION SET A | 138<br>INSTRUCTION SET B |
|---|---|---|---|
| CPU A | 64 bytes/cycle | EXECUTED | EXECUTED |
| CPU B | 16 bytes/cycle | NOT EXECUTABLE | EXECUTED |
| CPU C | 8 bytes/cycle | NOT EXECUTABLE | NOT EXECUTABLE |
| CPU D | 32 bytes/cycle | EXECUTED | EXECUTED |

IDENTIFICATION OF A COMPUTER PROCESSING UNIT

TECHNICAL FIELD

This disclosure relates in general to the field of computing and/or networking, and more particularly, to the identification of a computer processing unit.

BACKGROUND

Emerging network trends in both data center and telecommunication networks place increasing performance demands on a system. Application performance depends on good use of the network and efficient use of the resources on the network. One resource on the network is a computer processing unit (CPU) and proper identification of the CPU can help in determining how to efficiently execute processes and applications.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system for the identification of a computer processing unit (CPU). Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
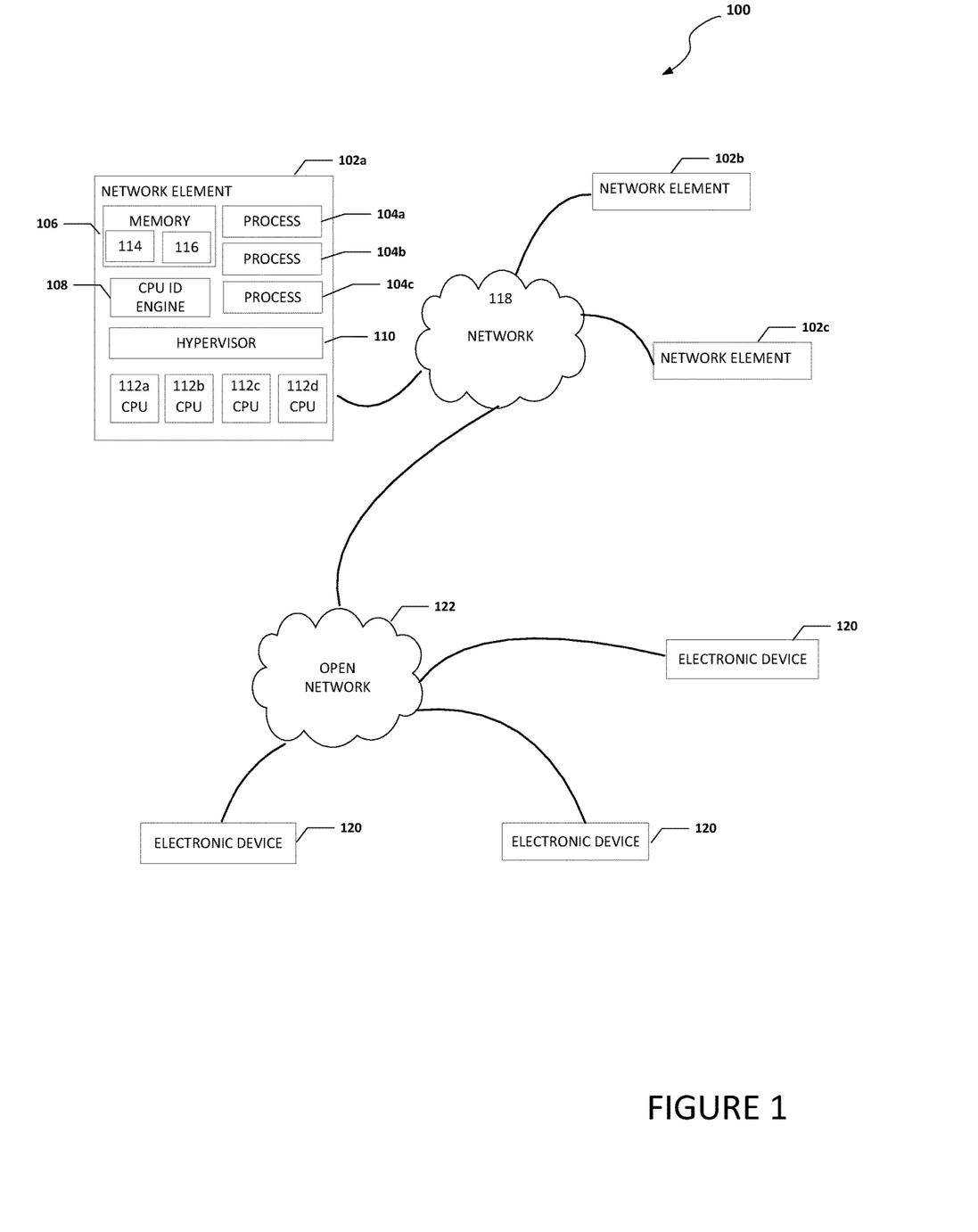
FIG. 1 is a simplified block diagram of a system for the identification of a computer processing unit, in accordance with an embodiment of the present disclosure.

FIG. 1 is a simplified block diagram of a system 100 to enable the identification of a CPU, in accordance with an embodiment of the present disclosure. System 100 can include one or more network elements 102a-102c. Each network element can include one or more processes, memory, a CPU table, a plurality of extensions, a CPU identification (ID) engine, a hypervisor, and one or more CPUs. For example, as illustrated in FIG. 1, network element 102a can include one or more processes 104a-104c, memory 106, a CPU ID engine 108, a hypervisor 110, and one or more CPUs 112a-112d. Memory 106 can include a CPU table 114 and an extensions database 116.

CPU table 114 can include data, characteristics, etc. that can be used to help identify the ID of a CPU. Extensions database 116 can include a plurality of extensions. Each process 104a-104d may be a virtual network function (VNF). In an example, each of processes 104a-104c may be a virtual part of an operating system that runs on part of a cloud network and is configured to run customer's data. Each CPU 112a-112d may be a virtual CPU. Network elements 102a-102c may be in communication with each other using network 118. Network 118 may be part of a data center. In an example, one or more electronic devices 120 and open network 122 may be in communication with network 118. Electronic device 120 may be user equipment or other electronic devices. Open network 122 may be the Internet or some other open network.

It is to be understood that other embodiments may be utilized and structural changes may be made without departing from the scope of the present disclosure. For example, each network element may have one or more processes, one or more regions of memory, and/or one or more CPUs. Substantial flexibility is provided by system 100 in that any suitable arrangements and configuration may be provided without departing from the teachings of the present disclosure.

In an example, system 100 can be configured to measure or otherwise determine one or more characteristics of a CPU and use the measured or otherwise determined one or more characteristics to determine the actual ID of the CPU. CPU ID engine 108 can begin to determine the actual ID of a CPU before a process is run and start binary instrumentation that can intercept the results of a query by a process to determine the CPU ID. For example, after the actual ID of the CPU is determined, queries from processes to determine the CPU ID can be intercepted and the results of the query can be replaced with the actual ID of the CPU. In a specific example, system 100 can be configured to determine the ID of the actual CPU being used (or will be used) to execute a process in system 100 and use binary instrumentation to replace a CPUID opcode result with the actual physical CPU ID in the code dispatch.

Instrumentation refers to an ability to monitor or measure the level of a product's performance, to diagnose errors and to write trace information. Binary instrumentation is a method of analyzing the behavior of a binary application at runtime through the injection of instrumentation code. This instrumentation code executes as part of the normal instruction stream after being injected. Binary instrumentation implementations generally fall into two categories: light-weight or heavy-weight. A light-weight binary instrumentation operates on the architecture-specific instruction stream and state when performing analysis. A heavy-weight binary instrumentation operates on an abstract form of the instruction stream and state. The binary instrumentation can be performed using a binary instrumentation tool (e.g., Pin, etc.) and is similar to a just-in-time (JIT) compilation or dynamic translation except the input is not the bytecode but an executable process. The binary instrumentation can intercept the execution of a first instruction of a process, analyze the straight-line sequence of instructions for the instructions configured to emulate a request for the CPU ID (e.g., CPUID opcode), and if found, determine if the response to the request for the CPU ID is the actual CPU ID and if not, replace the response to the request for the CPU ID with the actual CPU ID. The binary instrumentation can then copy the resulting code and execute it. The resulting code is executed until a first branch to call is received or a return is received. When the first branch to call or return is received, the process can be repeated until eventually the whole binary is inspected and modified or until a predetermined amount of time passes (e.g., a timeout). If binary instruction has function multi-versioning support, then the CPUID check is typically somewhere close to the start of the process.

Elements of FIG. 1 may be coupled to one another through one or more interfaces employing any suitable connections (wired or wireless), which provide viable pathways for network (e.g., network 118, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

When deploying a process, (e.g. process 104a) in a cloud such as an operator's private cloud, the process has little or no control over the configuration of the hypervisor, especially when OpenStack or similar cloud software initiates the hypervisor. Typically, the hypervisor configuration will pass down an incorrect or wrong CPU model ID to the processes. This is because a cloud typically includes many different generations of CPUs and it is more efficient for an administrator to maintain the cloud when all the VMs are represented as running on the same type of CPU when in reality the VMs are not actually running on the same type of CPU. If a process is compiled with function multi-versioning support for different CPU architectures, an automatic dispatch or configuration based on the results of a CPU ID query can cause an inefficient code path to be selected.

For example, the results of a CPUID opcode is usually the lowest common denominator in cloud settings and the hypervisor will report the same CPU ID (the lowest common CPU) to processes and applications. When a process that is compiled to the function multi-versioning support, the process very often gets the wrong CPU ID and sets a relatively inefficient or less efficient code path than could be used if the process was aware that it was running on a faster and/or newer CPU.

Function multi-versioning support is a means to dynamically dispatch executing code for particular CPUs. CPU architectures often gain interesting new instructions as they evolve, but application developers often find it difficult to take advantage of those instructions. Reluctance to lose backward-compatibility is one of the main roadblocks slowing developers from using advancements in newer computing architectures. Function multi-versioning support is a way to have multiple implementations of a function with each different version using a different CPU's specialized instruction-set extensions.

Some current solutions that try to properly identify the ID of a CPU implement a top-down approach that includes a combination of enhanced platform awareness cloud features and a configuration of the hypervisor that will pass the correct CPU ID. However, the top-down approach requires extra time and expenses when the system administrator sets up and runs the system (e.g., a cloud network). Default system or cloud configurations are easier to manage and less time consuming from an administrator standpoint and therefore the top down approach is seldom used. What is needed is a solution that uses a bottom-up approach and does not make any assumptions about cloud configuration.

A system for the identification of a CPU, as outlined in FIG. 1, can resolve these issues (and others). System 100 can be configured to determine the ID of the actual physical CPU being used in system 100 and use binary instrumentation to replace a CPUID opcode result with the actual physical CPU ID in the code dispatch. In an example, CPU ID engine 108 can run measurements or tests where the results of the measurements or tests cannot be spoofed by the hypervisor to determine the actual CPU ID.

System 100 can be configured to measure or otherwise determine one or more characteristics of a CPU to determine the actual ID of the CPU. After the actual ID of the CPU is determined, the results of a query from processes to determine the CPU ID can be intercepted and the result of the query can be replaced with the actual ID of the CPU. In a specific example, binary instrumentation may be used to intercept or hook the results of the query and replace the results with the actual ID of the CPU. Binary instrumentation allows the system to intercept some selected number of processor instructions and replace the results of the query with the actual ID of the CPU. More specifically, system 100 can be configured to intercept the CPUID opcode and replace the results of the CPUID opcode with the actual ID of the CPU.

After first invocation of the CPUID opcode or if there is no CPUID opcode call in the instruction stream for a predetermined amount of time (e.g., about a millisecond after execution of a process starts), the binary instrumentation stops and the process is allowed to run at normal speed.

When running on a non-optimally configured cloud/hypervisor, system 100 can be configured to make it possible to achieve better performance by utilizing the latest instruction sets available in the CPU.

In an example, the hypervisor is typically configured to return a CPU ID that is different than the actual physical CPU ID that will be used by a process because in a network, when all CPUs look the same, it is easier for an administrator to migrate, downsize, upsize, etc. components of the network. To avoid or correct the wrong CPU ID in a query response, the CPU ID engine can perform tests or measurements of the CPU and use the results of the tests or measurements to identify the actual CPU ID and communicate the actual CPU ID to the process.

More specifically, for server CPU models, the L1 bandwidth doubled or was at least increased between generations of CPUs. The L1 bandwidth is relatively easy to measure and determine and the hypervisor cannot spoof the results. Further, one or more instruction sets can be sent to the CPU to determine if the CPU can execute the instruction sets. Also, instructions can be added so the system can check by SIGILL trap. The SIGILL trap is programmer defined hook that is invoked if an instruction is not supported on a CPU and is easy to measure and difficult to spoof.

After the actual CPU ID is determined and if it is different from the results of the CPUID opcode, it is possible to start executing the process using an extension that will hook the CPUID opcode from a compiler multi versioning dispatch initialization and dynamically replace the results of the CPUID opcode so the correct code path is chosen based on the actual ID of the physical CPU. After the actual ID of the physical CPU is determined, the application can run without binary instrumentation overhead.

Hooking the CPUID opcode results occurs at the user level and not at the kernel level. The binary instrumentation can be running for a few milliseconds because binary instrumentation runs slow. System 100 can ensure the whole shared library gets loaded together with the main process and all shared libraries, if they are also compiled as a functional versioning application, would run their own CPUID query and the results of the CPUID query can be intercepted and replaced with the real CPU ID. CPU ID engine 108 can then stop the binary instrumentation and allow the system to run at full speed.

CPUID opcode is a processor supplementary instruction for the x86 architecture allowing the system to discover details of the processor. Typically, the CPUID opcode will return the CPU's manufacturer ID string. By using the CPUID opcode, the system can determine a processor type and the presence of features (e.g., MMX/SSE). The CPUID opcode 0Fh, A2h (as two bytes, or A20Fh as a single word) and the value in the EAX register, and in some cases the ECX register, specifies what information to return. x86 is a family of backward-compatible instruction set architectures. Currently, the majority of personal computers and laptops sold are based on the x86 architecture and x86 dominates compute-intensive workstation and cloud computing segments.

Turning to the infrastructure of FIG. 1, system 100 in accordance with an example embodiment is shown. Generally, system 100 may be implemented in any type or topology of networks. Network 118 represents a series of points or nodes of interconnected communication paths for receiving and transmitting packets of information that propagate through system 100. Network 118 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as MPI, Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, MPI, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102c, are meant to encompass network elements, network appliances, servers, routers, switches, gateways, bridges, load balancers, processors, modules, or any other suitable device, component, element, or object operable to exchange information in a network environment. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102c may be virtual or include virtual elements.

In regard to the internal structure associated with system 100, each of network elements 102a-102c can include memory elements for storing information to be used in the operations outlined herein. Each of network elements 102a-102c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of system 100, such as network elements 102a-102c may include software modules (e.g., CPU ID engine 108) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
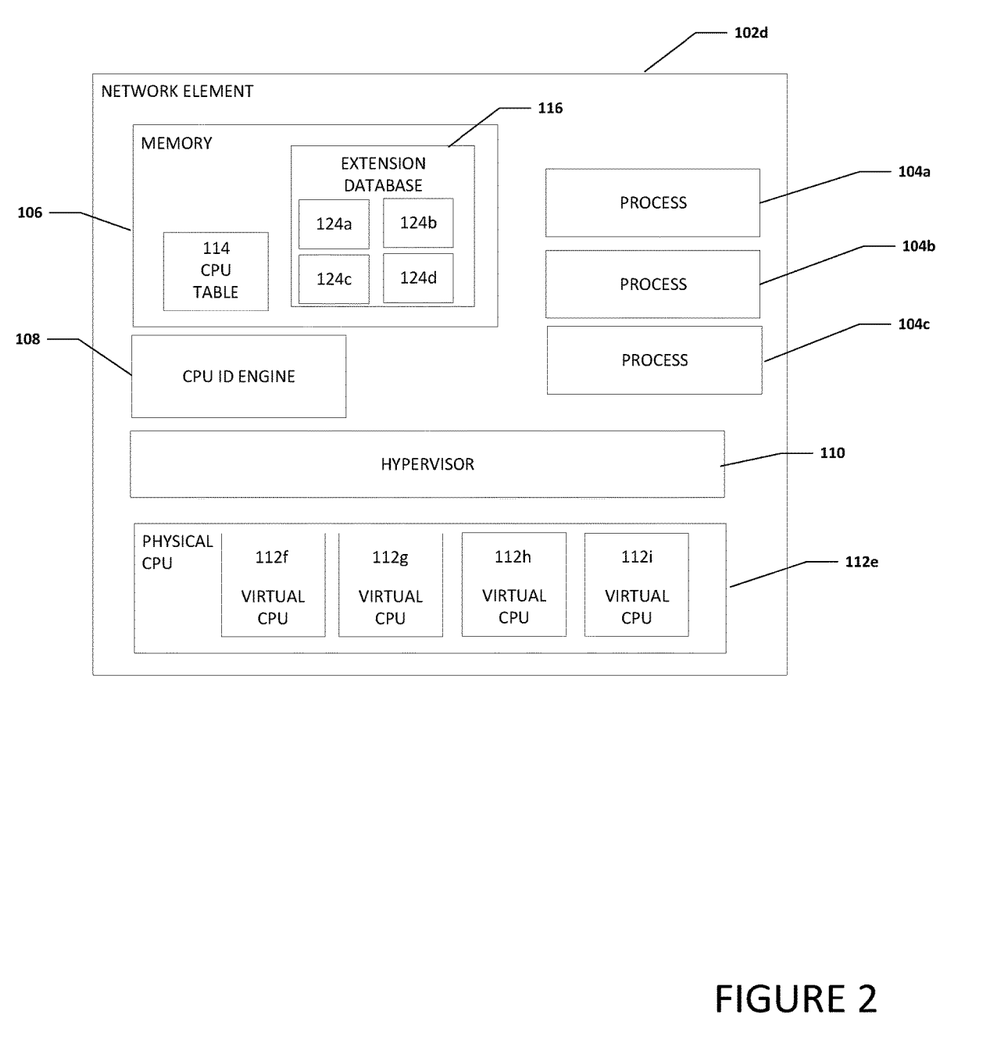
FIG. 2 is a simplified block diagram of a portion of a system for the identification of a computer processing unit, in accordance with an embodiment of the present disclosure.

Turning to FIG. 2, FIG. 2 is a simplified block diagram of a network element 102d to enable the identification of a CPU, in accordance with an embodiment of the present disclosure. Network element 102d can include one or more processes 104a-104c, memory 106, CPU ID engine 108, hypervisor 110, and a physical CPU 112e. Memory can include CPU table 114 and extension database 116. Extension database 116 can include a plurality of extensions 124a-124d. In an example, extension 124a may be streaming SIMD extensions, extension 124b may be AVX extension, extensions 124c may be AVX2 extensions, and extension 124d may be AVX-512 extensions. Note that each of extensions 124a-124d may be other types of extensions that those listed above. Physical CPU 112e can include one or more virtual CPUs 112f-112i and each virtual CPU may be a subset of physical CPU 112e.

When a process (e.g., process 104a) begins to execute, the processes may send a query (e.g., CPUID opcode) to a virtual CPU (e.g., virtual CPU 112f) to determine the CPU ID. Generations of different extensions (e.g., extensions 124a-124d) can be supported by a CPU and it is preferable to select the extension that will most efficiently run on the CPU. A process can be complied to support several extensions and when the process starts, an extension is selected based on what CPU ID was returned in response to a query.

In response to the query, the virtual CPU can provide the correct CPU ID and communicate the correct CPU ID to hypervisor 110 for hypervisor 110 to communicate the CPU ID to the process. However, to homogenize the network, hypervisor 110 may be configured to change the correct CPU ID to a different incorrect CPU ID and communicate the incorrect CPU ID to the process. This can cause the process to select an extension that will not efficiently run on the CPU.

In an illustrative example, process 104a can query virtual CPU 112f to determine the CPU ID of virtual CPU 112f. The CPU ID of virtual CPU 112f may be one that allows extension 124d to most efficiently run on virtual CPU 112f. Virtual CPU 112f can communicate the correct CPU ID to hypervisor 110. To homogenize the network, hypervisor 110 may be configured to change the correct CPU ID to a different incorrect CPU ID and communicate the incorrect CPU ID to process 102a. As a result of receiving the incorrect CPU ID, process 104a may select extension 124a to be executed, even though extension 124a will not efficiently run on virtual CPU 112f or at least not run as efficiently as extension 124d.

Figure 3:
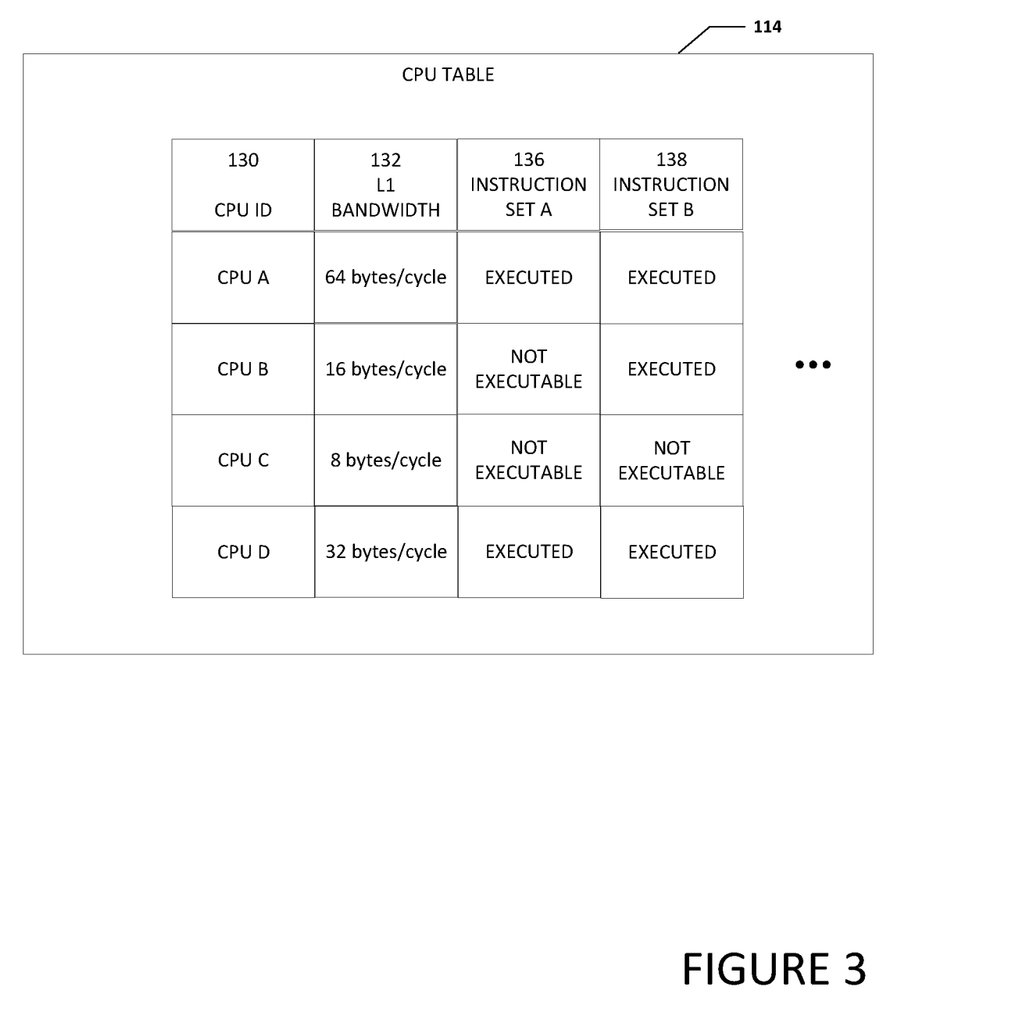
FIG. 3 is a simplified block diagram of a table illustrating examples details of the identification of a computer processing unit, in accordance with an embodiment of the present disclosure.

Turning to FIG. 3, FIG. 3 is a simplified CPU table 114 illustrating example details to enable the identification of a CPU, in accordance with an embodiment of the present disclosure. CPU table 114 includes one or more tests or measurements that CPU ID engine 108 can use to determine a CPU ID for a specific CPU. CPU table 114 can include a CPU ID column 130, a L1 bandwidth column 132, an instruction set A column 136, and an instruction set B column 138. In an illustrative example, if a L1 bandwidth measurement was performed on virtual CPU 112a (illustrated in FIG. 2) and the result was 54 bytes/cycle and if instruction set A was executed on virtual CPU 112a, then the CPU ID for virtual CPU 112a would be CPU A. CPU table 114 may include two or more tests or measurements that can be used to help determine the CPU ID of a CPU and can include different tests or measurements than those illustrated in FIG. 3.

In an example, an application can create and register an SIGILL trap of handler. The SIGILL trap or handler is a programmer defined hook that is invoked if an instruction is not supported on a CPU. When a CPU runs an unsupported instruction, the application that has the unsupported instruction will crash and the SIGILL trap or handler will be called.

Figure 4:
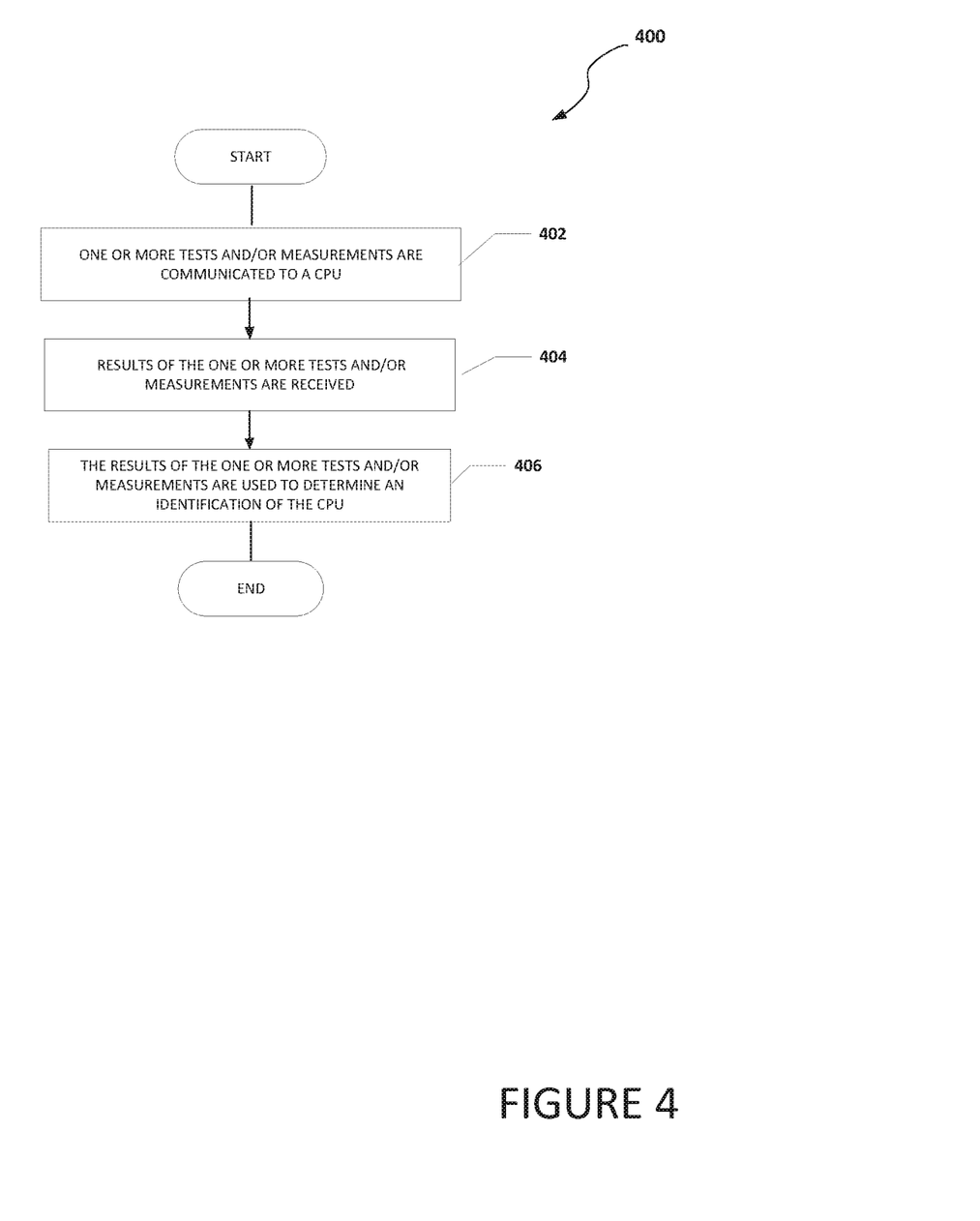
FIG. 4 is a simplified flowchart illustrating potential operations that may be associated with the system in accordance with an embodiment.

Turning to FIG. 4, FIG. 4 is an example flowchart illustrating possible operations of a flow 400 that may be associated with the enablement of the identification of a CPU, in accordance with an embodiment. In an embodiment, one or more operations of flow 400 may be performed by CPU ID engine 108. At 402, one or more tests and/or measurements are communicated to a CPU. For example, one or more test and/or measurements from CPU table 114 may be communicated to virtual CPU 112f. At 404, results of the one or more tests and/or measurements are received. At 406, the results of the one or more tests and/or measurements are used to determine an ID of the CPU.

Figure 5:
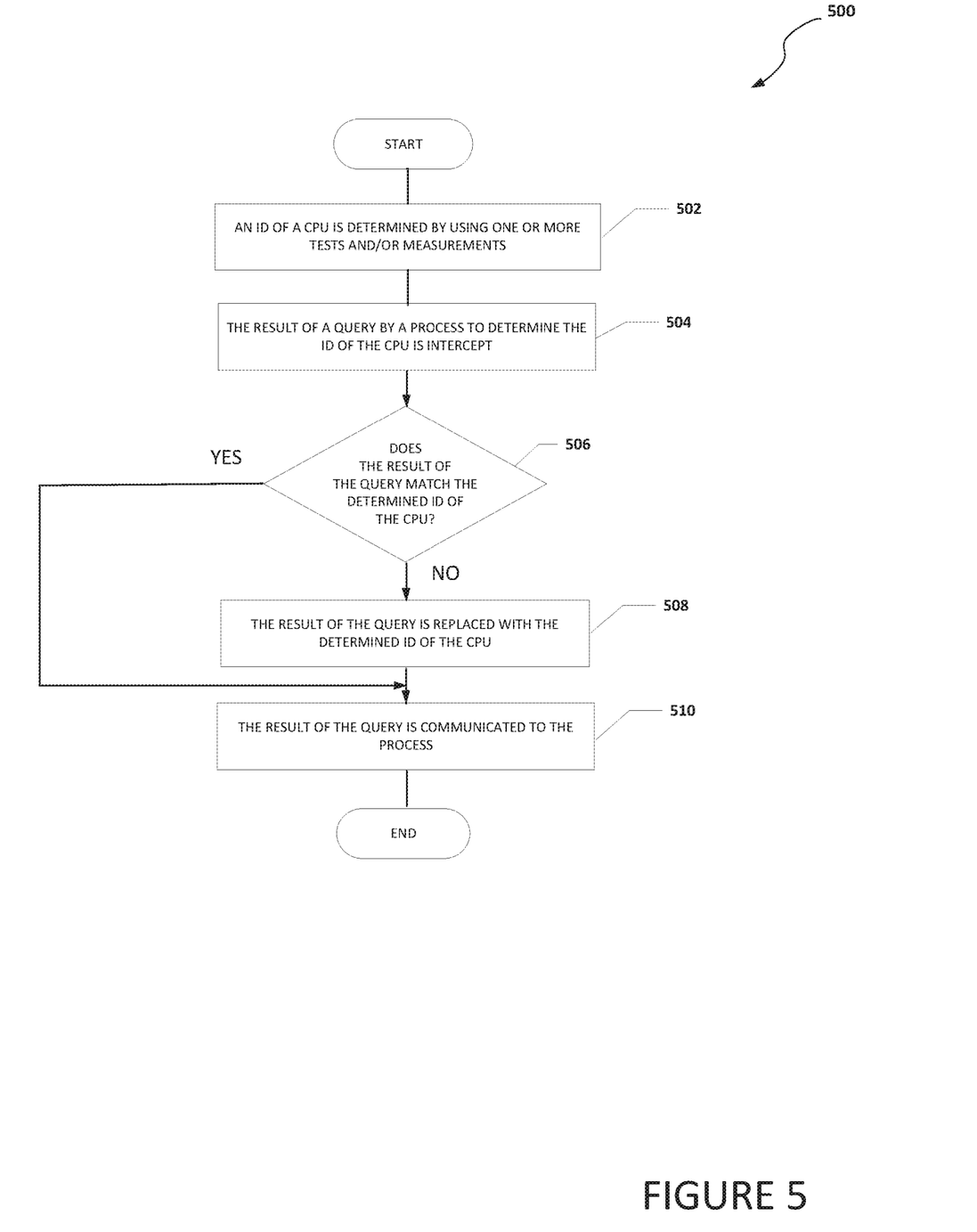
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with the enablement of the identification of a CPU, in accordance with an embodiment. In an embodiment, one or more operations of flow 500 may be performed by CPU ID engine 108. At 502, an ID of a CPU is determined by using one or more tests and/or measurements. For example, one or more test and/or measurements from CPU table 114 may be communicated to virtual CPU 112*f* to determine the CPU ID of virtual CPU 112*a*. At 504, the result of a query by a process to determine the ID of the CPU is intercepted. For example, process 104*a* may have sent a query to virtual CPU 112*f* requesting its CPU ID and the response from virtual CPU 112*f* was intercepted. At 506, the system determines if the result of the query matches the determined ID of the CPU. If the result of the query does not match the determined ID of the CPU, then the result of the query is replaced with the determined ID of the CPU. At 510, the result of the query is communicated to the process. If the result of the query does match the determined ID of the CPU, then the result of the query is communicated to the process, as in 510.

Figure 6:
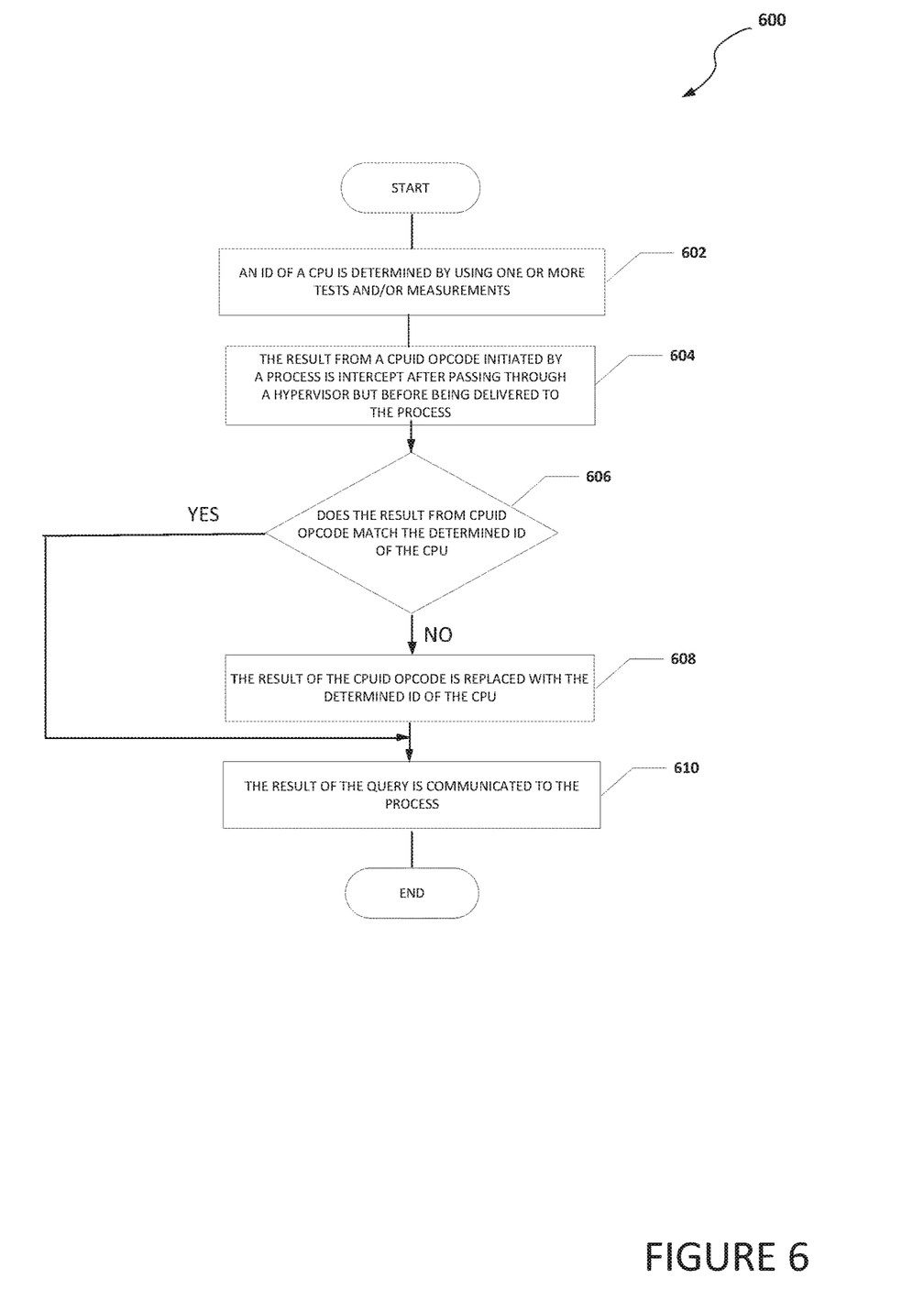
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with the enablement of the identification of a CPU, in accordance with an embodiment. In an embodiment, one or more operations of flow 600 may be performed by CPU ID engine 108. At 602, an ID of a CPU is determined by using one or more tests and/or measurements. For example, one or more test and/or measurements from CPU table 114 may be communicated to virtual CPU 112*f* to determine the CPU ID of virtual CPU 112*f*. At 604, the result from a CPUID opcode initiated by a process is intercepted after passing through a hypervisor but before being delivered to the process. At 606, the system determines if the result from the CPUID opcode matches the determined ID of the CPU. If the result of the CPUID opcode does not match the determined ID of the CPU, then the result of the CPUID opcode is replaced with the determined ID of the CPU. At 610, the result of the CPUID opcode is communicated to the process. If the result of the CPUID opcode does match the determined ID of the CPU, then the result of the query is communicated to the process, as in 610.

It is also important to note that the operations in the preceding flow diagrams (i.e., FIGS. 4-6) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor in a data center, cause the at least one processor to determine an identification (ID) of a computer processing unit (CPU) using one or more tests and/or measurements, intercept a result of a query from a process to determine the ID of the CPU, replace the result of the query with the determined ID of the CPU, and communicate the result of the query that includes the determined ID of the CPU to the process.

In Example C2, the subject matter of Example C1 can optionally include where the query is a CPUID opcode.

In Example C3, the subject matter of any one of Examples C1-C2 can optionally include where the results of the query are intercepted after passing through a hypervisor.

In Example C4, the subject matter of any one of Examples C1-C3 can optionally include where the hypervisor changed the results of the query to an incorrect ID of the CPU that does not match the determined ID of the CPU.

In Example C5, the subject matter of any one of Examples C1-C4 can optionally include where the CPU is a virtual CPU.

In Example C6, the subject matter of any one of Examples C1-C5 can optionally include where the one or more instructions further cause the at least one processor to determine, based on the determined ID of the CPU, an extension to be used in a multi-versioning support process.

In Example C7, the subject matter of any one of Examples C1-C6 can optionally include where the CPU is part of a data center.

In Example A1, a system in a data center can include a first network element, memory, a computer processing unit (CPU) identification (ID) engine, and at least one processor. The computer processing unit (CPU) identification (ID) engine is configured to cause the at least one processor to determine an ID of a CPU using one or more tests and/or measurements, intercept a result of a query from a process to determine the ID of the CPU, replace the result of the query with the determined ID of the CPU, and communicate the result of the query that includes the determined ID of the CPU to the process.

In Example, A2, the subject matter of Example A1 can optionally include where the query is a CPUID opcode.

In Example A3, the subject matter of any one of Examples A1-A2 can optionally include where the results of the query are intercepted after passing through a hypervisor.

In Example A4, the subject matter of any one of Examples A1-A3 can optionally include where the hypervisor changed the results of the query to an incorrect ID of the CPU that does not match the determined ID of the CPU.

In Example A5, the subject matter of any one of Examples A1-A4 can optionally include where the CPU is a virtual CPU.

Example M1 is a method including determining an identification (ID) of a computer processing unit (CPU) using one or more tests and/or measurements, intercepting a result of a query from a process to determine the ID of the CPU, replacing the result of the query with the determined ID of the CPU, and communicating the result of the query that includes the determined ID of the CPU to the process.

In Example M2, the subject matter of Example M1 can optionally include where the query is a CPUID opcode.

In Example M3, the subject matter of any one of the Examples M1-M2 can optionally include where the results of the query are intercepted after passing through a hypervisor.

In Example M4, the subject matter of any one of the Examples M1-M3 can optionally include where the hypervisor changed the results of the query to an incorrect ID of the CPU that does not match the determined ID of the CPU.

In Example M5, the subject matter of any one of the Examples M1-M4 can optionally include where the CPU is a virtual CPU.

In Example M6, the subject matter of any one of Examples M1-M5 can optionally include where the CPU is part of a data center.

Example S1 is a system in a data center for identification of a computer processing unit (CPU), the system can include memory, one or more processors, and a CPU identification (ID) engine. The CPU ID engine can be configured to determine an ID of a CPU using one or more tests and/or measurements, intercept a result of a query from a process to determine the ID of the CPU, replace the result of the query with the determined ID of the CPU, and communicate the result of the query that includes the determined ID of the CPU to the process.

In Example S2, the subject matter of Example S1 can optionally include where the query is a CPUID opcode.

In Example S3, the subject matter of any one of the Examples S1-S2 can optionally include where the results of the query are intercepted after passing through a hypervisor.

In Example S4, the subject matter of any one of the Examples S1-S3 can optionally include where the hypervisor changed the results of the query to an incorrect ID of the CPU that does not match the determined ID of the CPU.

In Example S5, the subject matter of any one of the Examples S1-S4 can optionally include where the CPU is a virtual CPU.

In Example S6, the subject matter of any one of the Examples S1-S5 can optionally include where based on the determined ID of the CPU, an extension to be used in a multi-versioning support process is determined.

In Example S7, the subject matter of any one of the Examples S1-S6 can optionally include where the CPU is a virtual CPU and part of a data center.

Example AA1 is an apparatus including means for determining an identification (ID) of a computer processing unit (CPU) using one or more tests and/or measurements, means for intercepting a result of a query from a process to determine the ID of the CPU, means for replacing the result of the query with the determined ID of the CPU, and means for communicating the result of the query that includes the determined ID of the CPU to the process.

In Example AA2, the subject matter of Example AA1 can optionally include where the query is a CPUID opcode.

In Example AA3, the subject matter of any one of Examples AA1-AA2 can optionally include where the results of the query are intercepted after passing through a hypervisor.

In Example AA4, the subject matter of any one of Examples AA1-AA3 can optionally include where the hypervisor changed the results of the query to an incorrect ID of the CPU that does not match the determined ID of the CPU.

In Example AA5, the subject matter of any one of Examples AA1-AA4 can optionally include where the CPU is a virtual CPU.

In Example AA6, the subject matter of any one of Examples AA1-AA5 can optionally include means for determining, based on the determined ID of the CPU, an extension to be used in a multi-versioning support process.

In Example AA7, the subject matter of any one of Examples AA1-AA6 can optionally include where the CPU is part of a data center.

Example X1 is a machine-readable storage medium including machine-readable instructions to implement a method or realize an apparatus as in any one of the Examples A1-A5, AA1-AA7, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A system comprising:
    a first processor; and
    a second processor to:
        determine actual computer processing unit identification (CPU ID) information about the first processor, including information that correctly indicates whether an instruction set extension is supported by the first processor; and
        correct incorrect CPU ID information about the first processor with the actual CPU ID information, including to correct information that incorrectly indicates whether the instruction set extension is supported by the first processor with the information that correctly indicates whether the instruction set extension is supported by the first processor.

2. The system of claim 1, wherein the first processor is to invoke an instruction to determine CPU ID information about the first processor, and wherein in response to the instruction a hypervisor is to provide the incorrect CPU ID information.

3. The system of claim 2, wherein the actual CPU ID information cannot be changed by the hypervisor.

4. The system of claim 2, wherein the instruction is a CPU ID instruction having an opcode of 0Fh A2h and indicating, in an EAX register, information to be returned in a result of the CPU ID instruction.

5. The system of claim 4, wherein the CPU ID instruction further indicates, in an ECX register, additional information to be returned in the result.

6. The system of claim 1, wherein the instruction set extension is one of a plurality of instruction set extensions, including SIMD instruction set extensions.

7. The system of claim 1, wherein the actual CPU ID information includes information to indicate a memory bandwidth capability.

8. The system of claim 1, wherein the second processor is to communicate at least some of the actual CPU ID information to the first processor.

9. The system of claim 1, wherein the information that correctly indicates whether the instruction set extension is supported by the first processor indicates that an instruction is not supported by the first processor.

10. The system of claim 1, wherein the first processor is part of a computer processing unit (CPU) and the second processor is not part of a CPU.

11. A system comprising:
a first processor;
a hypervisor to provide incorrect CPU ID information about the first processor; and
a second processor to:
  determine actual computer processing unit identification (CPU ID) information about the first processor, including information that correctly indicates whether an instruction set extension is supported by the first processor; and
  correct the incorrect CPU ID information about the first processor with the actual CPU ID information, including to correct information that incorrectly indicates whether the instruction set extension is supported by the first processor with the information that correctly indicates whether the instruction set extension is supported by the first processor.

12. The system of claim 11, wherein the first processor is to invoke an instruction to determine CPU ID information about the first processor, wherein the instruction is a CPU ID instruction having an opcode of 0Fh A2h and indicating, in an EAX register, information to be returned in a result of the CPU ID instruction, and wherein in response to the instruction the hypervisor is to provide the incorrect CPU ID information.

13. The system of claim 12, wherein the actual CPU ID information cannot be changed by the hypervisor.

14. The system of claim 11, wherein the second processor is to communicate at least some of the actual CPU ID information to the first processor.

15. The system of claim 11, wherein the information that correctly indicates whether the instruction set extension is supported by the first processor indicates that an instruction is not supported by the first processor, and wherein the first processor is part of a computer processing unit (CPU) and the second processor is not part of a CPU.

16. A method comprising:
determining, with a second processor, actual computer processing unit identification (CPU ID) information about a first processor, including information that correctly indicates whether an instruction set extension is supported by the first processor; and
correcting, with the second processor, incorrect CPU ID information about the first processor with the actual CPU ID information, including correcting information that incorrectly indicates whether the instruction set extension is supported by the first processor with the information that correctly indicates whether the instruction set extension is supported by the first processor.

17. The method of claim 16, further comprising:
the first processor invoking an instruction having an opcode of 0Fh A2h to determine CPU ID information about the first processor; and
in response to the instruction, a hypervisor providing the incorrect CPU ID information.

18. The method of claim 17, wherein the actual CPU ID information cannot be changed by the hypervisor.

19. The method of claim 16, further comprising the second processor communicating at least some of the actual CPU ID information to the first processor.

20. The method of claim 16, wherein determining the information that correctly indicates whether the instruction set extension is supported by the first processor includes determining information that indicates that an instruction is not supported by the first processor, and wherein the first processor is part of a computer processing unit (CPU) and the second processor is not part of a CPU.

21. At least one machine readable medium comprising instructions that, when executed by a second processor, causes the second processor to:
determine actual computer processing unit identification (CPU ID) information about a first processor, including information that correctly indicates whether an instruction set extension is supported by the first processor; and
correct incorrect CPU ID information about the first processor with the actual CPU ID information, including to correct information that incorrectly indicates whether the instruction set extension is supported by the first processor with the information that correctly indicates whether the instruction set extension is supported by the first processor.

22. The at least one machine readable medium of claim 21, wherein the first processor is to invoke an instruction having an opcode of 0Fh A2h to determine CPU ID information about the first processor, wherein in response to the instruction a hypervisor is to provide the incorrect CPU ID information, and wherein the actual CPU ID information cannot be changed by the hypervisor.

23. The at least one machine readable medium of claim 21, wherein the instructions, when executed by the second processor, cause the second processor to communicate at least some of the actual CPU ID information to the first processor, and wherein the first processor is part of a computer processing unit (CPU) and the second processor is not part of a CPU.

* * * * *